United States Patent
Li

(10) Patent No.: US 11,329,282 B2
(45) Date of Patent: May 10, 2022

(54) RECHARGEABLE BATTERIES AND METHODS OF MAKING SAME

(71) Applicant: BETTERGY CORP., Peekskill, NY (US)

(72) Inventor: Lin-Feng Li, Croton On Hudson, NY (US)

(73) Assignee: Bettergy Corp., Peekskill, NY (US)

( * ) Notice: Subject to any disclaimer, the term of this patent is extended or adjusted under 35 U.S.C. 154(b) by 263 days.

(21) Appl. No.: 16/802,061

(22) Filed: Feb. 26, 2020

(65) Prior Publication Data

US 2020/0274155 A1 Aug. 27, 2020

Related U.S. Application Data

(60) Provisional application No. 62/810,439, filed on Feb. 26, 2019.

(51) Int. Cl.
| | | |
|---|---|---|
| *H01M 4/38* | (2006.01) |
| *H01M 4/133* | (2010.01) |
| *H01M 4/137* | (2010.01) |
| *H01M 4/66* | (2006.01) |
| *H01M 2/16* | (2006.01) |
| *H01M 50/46* | (2021.01) |
| *H01M 4/02* | (2006.01) |

(52) U.S. Cl.
CPC .......... *H01M 4/382* (2013.01); *H01M 4/133* (2013.01); *H01M 4/137* (2013.01); *H01M 4/661* (2013.01); *H01M 4/669* (2013.01); *H01M 50/46* (2021.01); *H01M 2004/021* (2013.01)

(58) Field of Classification Search
CPC .................................................... H01M 4/366
See application file for complete search history.

(56) References Cited

U.S. PATENT DOCUMENTS

2017/0338475 A1* 11/2017 Laramie ............ H01M 10/0525

* cited by examiner

*Primary Examiner* — Stephan J Essex
(74) *Attorney, Agent, or Firm* — Robert W. Morris; Eckert Seamans Cherin & Mellott, LLC

(57) ABSTRACT

Systems and methods for rechargeable batteries are provided. In an embodiment, a battery may include a cathode, an anode, an electrolyte solution, and a current collector. The anode may include a 3D porous structure. The 3D porous structure may have a higher electrical conductivity at one end than at the other end, and lithium ions may be dispersed throughout the 3D porous structure.

13 Claims, 3 Drawing Sheets

RECHARGEABLE BATTERIES AND METHODS OF MAKING SAME

CROSS-REFERENCE TO RELATED APPLICATION

This application claims priority to Provisional Patent Application No. 62/810,439, filed Feb. 26, 2019, the disclosure of which is incorporated herein in its entirety.

FIELD OF THE INVENTION

The present invention relates to electrochemical energy storage devices, such as batteries which contain a lithium metal anode.

BACKGROUND OF THE INVENTION

Lithium ion batteries since their introduction have doubled in specific energy to over 250 Wh/kg. These batteries have found widespread application in portable electronics and mobile communications devices as well as in, for instance, HEVs, PHEVs and EVs. The specific energy of the lithium ion battery has nonetheless reached a plateau—and room for improvement has been limited. Researchers are increasingly focusing their attentions on battery chemistries beyond lithium ion batteries. Among these, rechargeable lithium metal batteries, where lithium metal is used as the anode, have been considered as promising candidates for development and commercialization. However, the lithium metal anode, although having high specific capacity (3860 mAh/g), still suffers from issues of dendrite growth, solid electrolyte interface ("SEI") instability and volume change during cycling. While great effort has been made to try to address these issues, the successful solution is yet to emerge.

Lithium sulfur batteries have been viewed as promising candidates due to the use of abundant and low cost sulfur material (sulfur price is currently at roughly $0.57/kg with 10,000,000 tons/year production as the oil refinery by-product), and most importantly, an extremely high theoretical specific energy of 2680 Wh/kg (S. Zhang, *J. Power Sources*, 2013, 231, 153; S. Zhang, *Energies*, 2012, 5, 5190)—about 4.6 times higher than that of the conventional lithium ion battery. However, even with over three decades of R&D effort, commercial Li/S batteries have yet to be introduced into the market due to many challenges relating to the battery chemistry. These challenges include short cycle life, especially for sulfur electrodes with high areal loading over 5 mAh/cm$^2$, low cycling efficiency, high self-discharge rate due to polysulfite shuttling, as well as issues associated with lithium metal anodes.

Another candidate is a battery with a lithium metal anode and a high specific capacity cathode, such as that shown at http://www.greencarcongress.com/2009/12/panasonic-20091225.html and http://www.solidenergysystems.com/technology.html) (with specific capacity over 200 mAh/g). However, the development of a high performance lithium metal anode is the key to the success of such batteries.

While a lithium metal electrode is routinely used in primary lithium batteries, it has not been successfully commercialized in rechargeable batteries due to problems with lithium dendrite growth and SEI instability. In fact, a fire problem caused the eventual failure of the very first lithium metal based battery developed by Exxon (K. Nishio, N. Furukawa, in *Handbook of Batteries Materials*, Ed. J. O. Besenhard, p. 56, Wiley-VCH, Weinheim, 1999). The problems hindering the development of rechargeable lithium metal batteries can be now traced to three main issues.

The first issue is the formation and growth of lithium dendrites during repeated cycling, leading to cell shorting and causing safety concerns. Such dendritic lithium growth could also reduce the charging efficiency and causes dead lithium formation which leads to voltage drop.

The second issue is related to the instability of the SEI layer on the lithium anode in an organic electrolyte; side reactions can consume the electrolyte and lead to cell failure.

The third problem is related to the volume change during lithium deposition and stripping. This issue becomes more pronounced for high areal capacity lithium anodes (>12 mAh/cm$^2$) and for discharging at very high rates.

A tremendous amount of theoretical and experimental work has gone into the development of an understanding of lithium dendrite formation and its prevention and it is now widely recognized that rechargeable lithium batteries with conventional liquid electrolytes do not work. Theoretical work by Newman and his coworker found that polymer electrolytes or other SEI layer with a critical modulus (>ca. 6 GPa) value can effectively block lithium metal dendrite growth. C. Monroe, J. Newman, *J. Electrochem. Soc.*, 2005, 152, A396.

Efforts have been devoted to mitigating the problem on lithium metal by using electrolyte additives, artificial SEI layer formation or surface coating, lithium metal alloy anode, solid state electrolytes and 3D lithium anodes. The ionic conductivity of solid state electrolytes including polymer electrolytes and inorganic electrolytes has been significantly improved in recent years. However, due to their solid nature, the contact resistance between solid state electrolytes and the electrode is still high—limiting their usage in high power applications. Electrolyte additives, such as organic solvent FEC, Cs$^+$ salt and LiNO$_3$ were found to be effective in obtaining smooth lithium deposition or increasing the Coulombic efficiency. However, the SEI layer formed in the electrolyte is effective only at low areal capacity and the SEI layer tends to crack with high capacity lithium stripping, leading to early failure. Artificial SEI formation on the lithium surface can be employed to tailor an SEI layer which can be more effective. Nanometer thick inorganic Li$_3$PO$_4$ SEI has shown lower impedance than Li metal without SEI coating; the electrode also demonstrated up to 1 mA/cm$^2$ without SEI layer cracking. However, at 2 mA/cm$^2$, the SEI layer tends to crack during cycle. Recently, Yi Cui's group (D. Lin, Y. Liu, W Chen, G. Zhou, K. Liu, B. Dunn, Y. Cui, *Nano. Lett.*, 2017, 17, 3731) demonstrated a gas phase method to create artificial inorganic LiF SEI layer by reacting lithium metal with Freon gas at 150° C. The SEI protected Li exhibited good cycle stability in Li/S cells. However, a pure inorganic SEI layer still has stability issues due to large volume change for Li metal anode with high areal loading. Moreover, the preparation method involves very active molten lithium metal and is hard to implement in practical applications.

Recently, three dimensional (3D) lithium metal electrodes were investigated to reduce the current density of the lithium metal, to inhibit lithium dendrite growth, and to accommodate Li volume change during battery cycling. The electrode has shown much better power performance, cycle stability and coulombic efficiency.

3D structural engineered lithium anodes have become a very promising strategy to solve not only the dendrite growth issue but also to increase the areal loading of the lithium anode without compromising the cycle performance. In these 3D structures, both conductive frameworks, including carbon-based frameworks and metal-based frameworks, and non-conductive frameworks, such as polyimide non-woven paper, were employed to host the lithium deposition.

Mukherjee et al. (R. Mukerjee, A. V. Thomas, D. Datta, E. Singh, J. Li, O. Eksik, V. B. Shenoy, N. Koratar, *Nat. Comm.*, 2014, 5, 3710) used porous graphene networks as the lithium anode host. The electrode exhibited over 900 mAh/g capacity and over 1000 charge/discharge cycles with coulombic efficiency over 99%. Nanostructured lithium metal anodes based on graphene also showed very high stable areal capacity of 5 mAh/cm$^2$. By using rGO film which contains rich lithiophilic groups or using CVD Si coating porous carbon scaffold, Cui et al. (Z. Liang, D. Lin, J. Zhao, Z. Lu, Y. Liu, C. Liu, Y. Lu, H. Wang, K Yan, X Tao, Y. Cui, *PNAS*, 2016, 113, 2862) was able to infuse Li metals thermally into the 3D structure. The electrode with Si coated scaffold has demonstrated a very high stable capacity of 2000 mAh/g at low areal loading of 1 mAh/cm$^2$, which could not be used in the practical high energy density batteries. Free standing hollow carbon fiber felt was employed previously by Liu et al. (L. Liu, et al., *Joule*, 2017, 1, 563) to make the 3D lithium anode. In their processes, impregnation of metal lithium inside the 3D structure was made through electrochemical deposition. Moreover, due to lower electronic conductivity, the electrode cannot be used in making standard cylindrical or pouch type rechargeable batteries. Other carbon fibers or carbon nanofibers were also employed in making the 3D lithium anodes. However, high surface area carbon could significantly increase the contact area between lithium metal and electrolyte, resulting in consumption of the electrolyte in SEI layer formation. Additionally, poor mechanical stability and low electronic conductivity could be an issue for making commercial lithium batteries.

FIG. 1 is a schematic illustration of Li deposition processes into a 3D Cu nanowire substrate.

Metal based 3D structures, such as nanostructured copper framework, stainless steel fiber felt and fibrous Li$_7$B$_6$ matrix were employed in making a 3D lithium anode. For example, a free-standing 3D copper nanowire network was successfully prepared and used as the 3D Li anode current collector. Up to 7.5 mAh/cm$^2$ areal capacity of lithium can be deposited into the current collector without dendrite growth. The electrode also exhibited 98.6% coulombic efficiency for 200 cycles at 1 mA/cm$^2$ rate—far better than 50% efficiency in 50 cycles for Li anode on planar copper current collector. A rate of about 10 mA/cm$^2$ was also demonstrated. 3D anodes seem to be able to solve the areal capacity issue, rate issue, volume change issue and dendrite growth issue.

Nonetheless, by carefully analyzing these results, one can see that all of these approaches involved costly material and processes. Most importantly, the top-down lithium deposition cannot be sustained over many cycles and dendrite growth formation occurs on the current collector.

As confirmed by SEM observation and due to the high electronic conductivity of the 3D current collector, the top and bottom of the 3D current collector have the same electrochemical potential. However, the top part of the current collector has fast access to the Li ion (short diffusion pathway from the electrolyte), so lithium deposition will take place on the top of the current collector as shown in FIG. 1. Over time, lithium deposition will push downward to the bottom. Over long cycles, the channel for Li ion diffusion could be blocked and the lithium deposition will continue on the top part, which could lead to bypass 3D current collector and form lithium dendrites on the top part—defeating the advantage of the 3D structure.

In another prior art (Q. Yu, Y. B. He, W. Lv, Y, Zhao, B. Li, F. Kang, Q. H. Yang, *Adv. Mater.*, 2016, 28, 6932), a 3D porous current collector was prepared by etching off zinc from a brass foil. Such a 3D structure was fragile to handle. Lithium was also introduced by electrochemical deposition of lithium metal into the 3D structure. Similar to the previous 3D structures, the lithium tends to grow on top of the current collector instead inside the 3D current collector.

Commercial nickel and copper foam has also been used to make the 3D lithium anode. The electrode suffered the same problem as all metal based 3D current collectors due to high electronic conductivity on the surface, which could promote preferential lithium deposition on top. Additionally, the thinnest commercial nickel foam is over 200 µm, which may be too thick in high energy density battery applications.

Another practical problem in the art is associated with the methods to pre-lithiate the 3D structure. For Li/S or Li/Air batteries and even Li/metal oxides (e.g. LiCoO$_2$ or other metal oxide based cathode materials) batteries, pre-lithiated anodes are needed. Electrochemical deposition on 3D current collectors has been employed, but is not feasible in practical applications due to cost concerns. The thermal infusion method through molten lithium was widely used as the alternative in the literature. There are three issues associated with this process. First, it is very hard to scale up the process for industrial applications due to the inert environment requirement, e.g. glove box filled with inert gas, and great safety concerns. Secondly, the amount of the infused lithium cannot be well controlled. The lithium metal usually will occupy all of the void volume in 3D current collector, which is not a problem for Li/S or Li/Air batteries since the first step in those batteries is discharging, and Li metal will be consumed. However, for Li/LiCoO$_2$ or Li/LiFePO$_4$ batteries, the first step is charging, where more Li metal will be deposited onto the 3D current collector. If the 3D structure is completely filled with Li, the extra Li metal will be deposited outside the 3D structure, leading to a greater tendency of dendrite growth. Also, an excess amount of Li could reduce the battery's specific energy. Thirdly, high temperature molten lithium could possibly damage 3D current collectors, and preclude use of certain polymers.

Pure polymer based 3D hosts were also investigated. Liang et al. (Z. Liang, et al., *Nano Lett.*, 2015, 15, 2910) used 3D polyacrylonitrile nanofiber felt as the lithium metal host. The polymer host solved the volume change problem of lithium anode during cycling. However, the electronic conductivity of the hosts is much weaker than that of carbon and metal 3D hosts.

In summary, current state-of-the-art 3D hosts showed promising performance for making 3D lithium metal anodes. However, they still suffer short cycle life at high areal loading, and problems in practical applications, including high cost, and difficulty in pre-lithiation.

SUMMARY OF THE INVENTION

It is thus an object of the present invention to provide an anode with a multiple layer 3D structure having a conductivity gradient throughout the structure. The bottom end of the anode (close to lithium) will have higher electronic conductivity and the top end of the anode (close to electrolyte) will have lower electronic conductivity, such that the Li deposition will take place from the bottom to top.

In order to overcome the drawbacks of current state-of-the-art rechargeable lithium metal batteries, innovative 3D lithium anode will be introduced. This will be discussed in the following sections.

DETAILED DESCRIPTION

Figure 1:
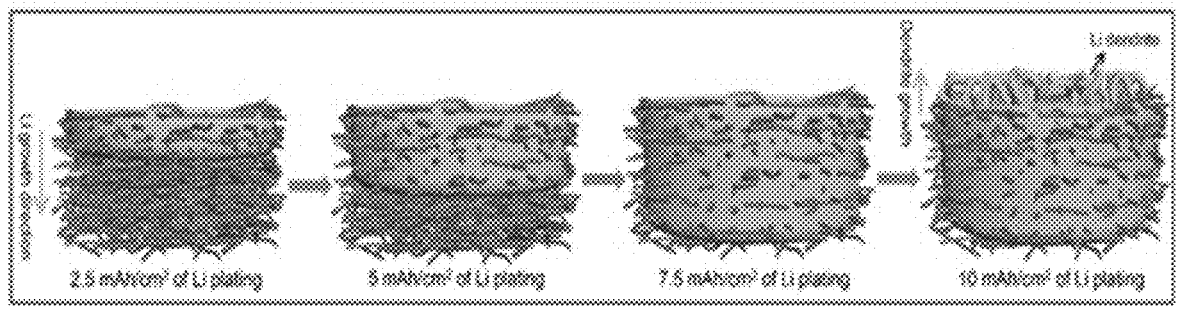
FIG. 1 is a set of diagrams depicting a prior art lithium anode.
Figure 2:
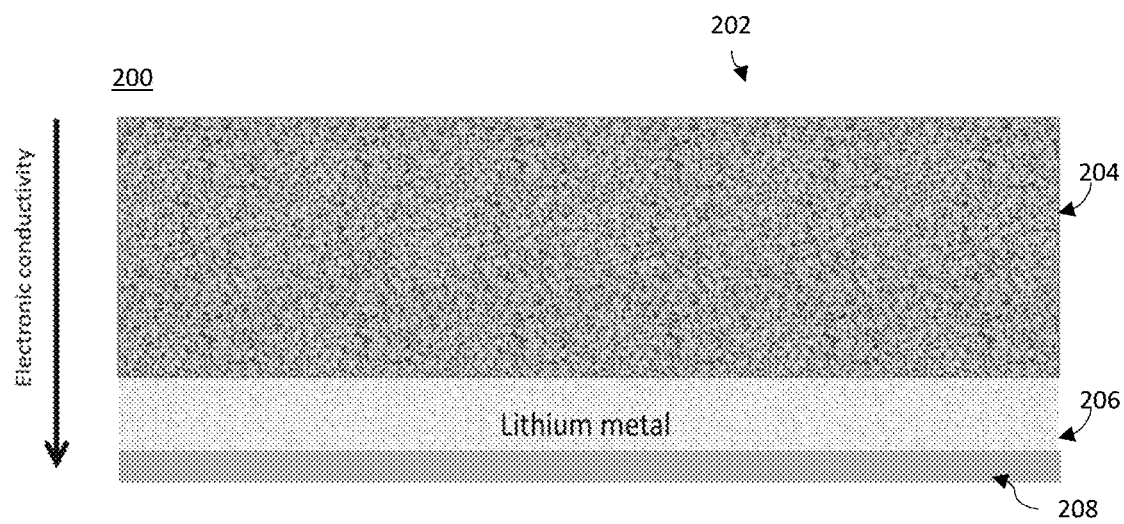
FIG. 2 is a schematic illustration of a 3D lithium anode, in accordance with various embodiments.

FIG. 2 is a schematic illustration of a 3D lithium anode, in accordance with various embodiments. In one embodiment, a 3D lithium anode 200 is coupled to an aqueous electrolyte solution 202 and may include a 3D conductive porous structure 204, a lithium metal layer 206, and a thin metal current collector 208. Current collector 208 may include a conventional anode current collector, including, but not limited to, copper, copper alloy, nickel, nickel alloy, stainless steel with thickness from 1 μm to 200 μm and more preferably, 5 μm to 10 μm. Lithium metal layer 206 may be made of pure metallic lithium with a thickness ranging from 5 μm to 200 μm. Lithium may be laminated or extruded on current collector 208 by any method known in the art. 3D porous structure 204 may have a thickness ranging from 5 μm to 500 μm, and more preferably from 10 μm to 150 μm, and most preferably from 20 μm to 80 μm.

In an embodiment, 3D structure 204 may have a porosity ranging from 30% to 95%, and more preferably from 60% to 90%. 3D structure 204 may be made of conductive materials in the form of particles or fibers or any other shapes, and polymer binders, including but not limited to PVdF, or polyimide. The electronic conductivity of 3D structure 204 may be designed to have high electronic conductivity at the bottom of the layer and lower electronic conductivity at the top of the layer by adjusting the conductivity of the material compositions. The conductive materials used may include conductive carbon and conductive metals (such as copper, nickel). By varying the ratio of carbon and metal in the formula, the conductivity of 3D structure 204 can form a gradient since metals have higher specific conductivity than carbon. Further, carbon and metals can be coated or doped with other lithiophilic elements, including but not limited to Sn, Zn, Ag, Bi, In, Ga, Al, N, P, Si, Ge, or alloys of these elements. In preparation of 3D structure 204, conductive materials, polymer binder solution and/or pore former may be mixed to form a coating slurry, which may subsequently be casted on a substrate such as glass or release liner, followed by drying and removing of pore former and perhaps calendaring. A stand-alone 3D layer may thus be made. Such 3D structure 204 may be laminated onto metal/Li layer 206 or simply placed on top of the lithium layer 206 to make the 3D lithium anode for rechargeable lithium metal batteries.

Figure 3:
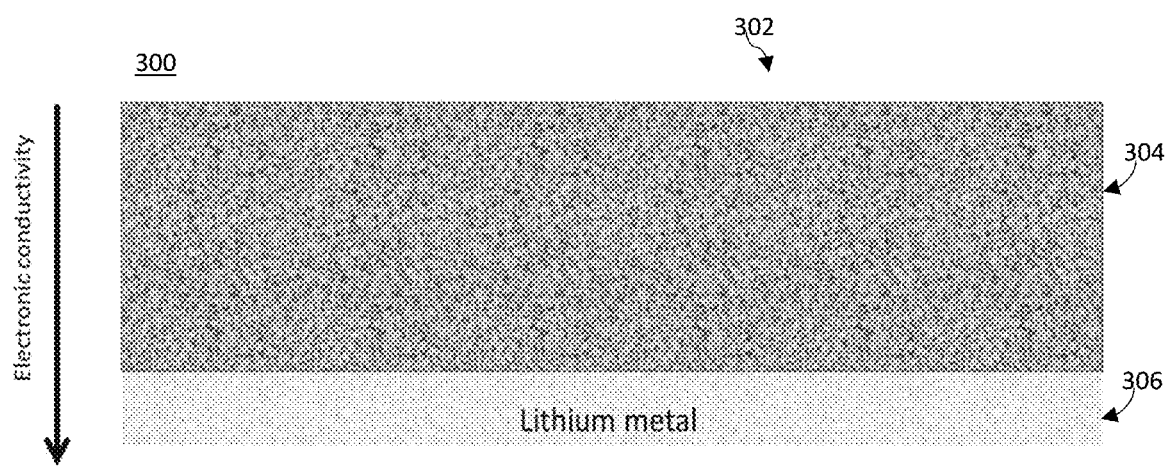
FIG. 3 is a schematic illustration of a 3D lithium anode, in accordance with various embodiments.

FIG. 3 is a schematic diagram of a 3D lithium anode, in accordance with various embodiments of the invention. In contrast to the anode shown in FIG. 2, the anode of FIG. 3 may lack a thin metal current collector, but may otherwise include all other structures as shown in FIG. 2.

Due to the conductivity gradient, different from any other 3D lithium anode, the lithium deposition may start from the bottom to top, instead of from the top to the bottom. The lithium stripping during cell discharging may thus start from the top to the bottom. This process may thus prevent lithium dendrite growth on top of 3D current collector. Moreover, doping and coating with lithiophilic elements can facilitate the smooth growth of lithium on top of 3D layer.

Unlike in the thermal lithium infusion method and the electrochemical plating method, in this method lithium foil can provide the lithium source.

Example 1. Zinc Doped Copper Powder

In an embodiment, a method of forming a lithium anode may be provided. In accordance with various embodiments, a brass powder with particle size about 10 μm to 50 μm was first washed with dehydrated alcohol to remove surface impurities. Then the powder was immersed in 1 M HCl and 2 M ammonium chloride water solution at elevated temperature of 50° C. After a couple of hours, the powder color changed from golden color to copper color. The power was then filtered and rinsed with copious water, followed by drying in the oven. The collected powder can be used directly to make the 3D structure or can be ball milled to reduce the size of the particle. By controlling the etching time, the residual amount of Zinc in the powder can be adjusted. The lithiophilic zinc can facilitate the uniform lithium deposition on 3D substrate.

In another embodiment, porous copper powder may be produced with well-established methods by etching of Zn or Mn from brass alloy or CuMn alloy powders. With controlled alloy composition and etching condition, nanoporous copper with different pore sizes can be made (as shown in FIG. 2a). After ball milling, 5~10 um size copper powder with submicron pores can be obtained. Such porous copper powder along with binder may be mixed and coated on the copper foil followed by drying, additional porous carbon layer coating, drying and calendaring. 3D current collector can thus be made with conventional coating process. In order to improve the lithiophilicity, residual zinc in copper through incomplete etching of brass will be used in this embodiment.

Example 2. Evaporation of Zinc on Nickel Powders

Nickel filament powder T255 from Vale with primary particle size of 2.2~2.6 μm can be surface coated with thermal evaporation processes as follows:

Mix 2 gram of metallic zinc flake and 1 gram of activated carbon in a ceramic boat.

Evenly spread 10 grams of nickel powders (Novamet Ni 255) on a pressed Ni sponge.

Place the Ni sponge on the mixed zinc flake and activated carbon.

Cover Ni powders with another Ni sponge.

Insert the ceramic boat into the center of a quartz tube inside the tubular oven.

Flush the quartz tube with forming gas (5 vol. % $H_2$ in $N_2$) for 10 minutes.

Increase temperature to 600° C.~700° C. at a rate of 5° C. per minute.

Keep the desired temperature for up to 30 minutes.

Cool down to room temperature.

The weight percentage of zinc on nickel powders are about 5 wt % to 15 wt %, depending on the annealing temperature and time.

The zinc coated Ni powder was then employed to make the 3D structure.

Example 3. Zinc Coated Nickel Powder

Sol-Gel coating process can also be used to coat the zinc oxide surface layer on nickel particles, followed by thermal reduction in forming gas, specifically:

Prepare Zn-containing sol solution in a 100 mL glass beaker by mixing zinc precursor (zinc acetate or zinc nitrate) and base (butylamine or ammonium hydroxide or mixed) in organic solvent (ethanol or 2-propanol).

Stir the sol solution for up to 5 hours at a mild temperature of 60-70° C.

Add 10.0 grams Ni powders (Novamet, Ni 255) into the sol solution.

Stir the mixed dispersion in a hood for more than 8 hours, until the completely evaporation of the organic solvent.

Transfer the Zn-precursor coated Ni powders into a ceramic boat and insert it into the center of a quartz tube inside the tubular oven.

Flush the quartz tube with forming gas (5 vol. % $H_2$ in $N_2$) for 10 minutes.

Increase temperature to 80° C. at a rate of 2° C. per minute and then keep the temperature for 4 hours.

Increase temperature to 550-650° C. at a rate of 1° C. per minute and then keep the temperature for up to 30 minutes.

Cool down to room temperature.

The weight percentage of zinc on nickel powders are about 5 wt % to 15 wt %, depending on the ratio of Zn precursor, final annealing temperature and time.

Zinc coated nickel powder thus made can be used to make 3D conductive structure for lithium anode.

Example 4. Doped Carbon Black

Zinc doped carbon black was prepared according to the following procedures:

Carbon black is soaked in zinc nitrate solution in weight ratio of 95:5.

Solution is dried.

Dry powder is heated up in tube furnace under flow of forming gas at 320° C. to decompose zinc nitrate for 1 hour; The temperature is then ramped up to 600° C. and kept at 600° C. for 2 hours.

After cooling down, zinc doped carbon black can be obtained.

The method of making nitrogen doped carbon black is well known in the art.

Example 5. 3D Structured Porous Nickel Film

Porous 3D structure can be made by following procedures:

Make 10% Matrimid solution by adding 1.02 g (Matrimid 5218, Huntsman) in a 4-ounce plastic container with 9.01 g NMP (1-methyl-2-pyrrolidinone, 99.5% Sigma-Aldrich) under vigorous stirring, at room temperature overnight.

Make precursor by adding 4.0 gram Zn-coated Ni powder (Ni 255 coated with Zn) in the above container with 10.0 gram 10% Matrimid solution.

Mix the precursor with centrifuge mixer (Speed Mixer, DAC 150 FVZ) at 2700 rpm for 2 min, three times.

Cast the precursor on clean glass plate with 5 and 10 mil casting blade, respectively Then place the glass plates in a hood for 4-6 hour at room temperature Merge the plates into warm water (40-50° C.), and gently peel off the films from the glass plate.

Dry the films for 1 day at room temperature

The thickness of the films are 33 µm, 55 µm, respectively

The thickness of the film can be varied by changing the gap of doctor blade. Other polymer resins, including but not limited to polyamide, polyamide imide, polyvinylidene fluoride, polyether ether ketone, can also be used to replace Matrimid. Pore former can also be included to change the porosity of the film.

Example 6. 3D Structure with Conductivity Gradient

Similar to Example 5, mixed N-doped carbon black and Zn coated nickel power were employed along with polymer binder. A thin layer with high percentage of zinc coated nickel powder was casted and dried, which was followed by additional casting with formula containing high percentage of N-doped carbon (lower electronic conductivity). After peeling off and drying, 3D structured porous film with conductivity gradient can be made. The layer with high metal content and higher conductivity will be placed directly on top of lithium metal foil or lithium metal foil on copper current collector to make 3D lithium anode.

Similar to Example 5, mixed N-doped carbon black and Zn doped copper (made from Example 1) were employed along with polymer binder. A thin layer with high percentage of Zn doped copper powder was first casted, followed by a layer of coating with high percentage of N-doped carbon black. After peeling off and drying, 3D structured porous copper film with conductivity gradient can be made. 3D lithium anode can be made similarly.

Example 7. Porosity Control of 3D Structure

Similar to the process used in example 5, additional microsize NaCl salt was added in certain percentage to make the casting slurry. After milling, the homogeneous ink will be used to cast the 3D structured substrate. After drying and peeling off, the film is then soaked in distilled water for a period of time, followed by drying in vacuum oven. By controlling the amount of NaCl addition (as pore former), the film porosity can be controlled to up to 95%.

Example 8. 3D Lithium Anode 3D lithium anode was made by laminating a layer of 3D structure made in Example 6 on top of lithium foil. This 3D lithium anode was punched in a disk size. Symmetric cells (cell type A) were made with two pieces of 3D lithium anode with Celgard 2400 separator and 1M $LiPF_6$ in DMC/EC (1:1) electrolyte. The cells were charged and discharged at 0.5 mA/$cm^2$ for 2 hours. As comparison, symmetric cells (cell type B) were made with two pieces of metallic lithium disk with Celgard 2400 separator and 1M $LiPF_6$ in DMC/EC (1:1) electrolyte and were cycled at 0.5 mA/$cm^2$ for 2 hours. The cell type A can last over a few hundred cycles before exhibiting increasing of cell voltage, while cell type B can only last for less than 15 cycles before cells develop erratic voltage profiles. Cell type A can also be cycled stably at high current density of 10 mA/$cm^2$ while cell type B cannot be cycled at such high current density for more than 10 cycles.

3D lithium anode with 3D structure with conductivity gradient can not only facilitate the bottom-up lithium deposition, but also block the lithium dendrite growth—extending the cycle life lithium metal batteries.

Example 9. Rechargeable Lithium Metal Cells 3D structure with conductivity gradient was made with Zn doped copper powder and N-doped carbon black. 3D lithium anode can then be made by laminating this 3D film on top of lithium metal or lithium metal on copper current collector. Disk of 3D lithium anode can be punched out. Coin cells can be made with NMC 532 cathode, Celgard 2400 separator and 3D lithium anode. Conventional electrolyte or any proper non-aqueous electrolyte can be used to make the coin cell. The cell was then be charged and discharged at C/5, C/2 and 5 C rate. Conventional coin cells with conventional lithium foil anode were also fabricated and cycled. The cells with 3D lithium anode showed much longer cycle life and higher rate capability than the conventional cells.

What is claimed is:

1. An anode, comprising:
an electrically conductive first layer comprising:
   a porous, three dimensional structure having a first end and a second end;
   a polymer; and
   particles comprising at least one of carbon and metal, said particles comprising a subset of particles, said subset having a high electrical conductivity that are distributed at a higher concentration toward the first end than the second end; and
a second layer comprising a lithium metal, wherein the second layer is coupled to the first end of the first layer;
wherein the particles satisfy at least one of the following (a) and (b):
   (a) the particles comprise at least one of copper and nickel, and are surface coated with at least one of tin, zinc, argon, bismuth, indium, gallium, aluminum, nitrogen, phosphorous, silicon, and germanium; and
   (b) the particles are doped with at least one of tin, zinc, argon, bismuth, indium, gallium, aluminum, nitrogen, phosphorous, silicon, and germanium.

2. The anode of claim 1, wherein the second end is configured to couple with a separator and an electrolyte solution.

3. The anode of claim 1, further comprising a metal current collector, wherein the current collector comprises at least one of copper, nickel, and stainless steel.

4. The anode of claim 2, further comprising a metal current collector, wherein the current collector comprises at least one of copper, nickel, and stainless steel.

5. The anode of claim 4, wherein the second layer comprises pure metallic lithium.

6. The anode of claim 2, wherein the first layer comprises a porosity between 60 and 90 percent.

7. The anode of claim 1, further comprising a third layer, the third layer being a metal current collector comprising at least one of copper, nickel, and stainless steel, and wherein the third layer is coupled to the second layer.

8. A battery, comprising:
an anode, comprising:
   an electrically conductive first layer comprising:
      a porous, three-dimensional structure having a first end and a second end;
      a polymer; and
      particles comprising at least one of carbon and metal, said particles comprising a subset of particles, said subset having a high electrical conductivity that are distributed at a higher concentration toward the first end than the second end; and
   a second layer comprising lithium metal, wherein the second layer is coupled to the first end of the first layer
   wherein the particles satisfy at least one of the following (a) and (b):
   (a) the particles comprise at least one of copper and nickel, and are surface coated with at least one of tin, zinc, argon, bismuth, indium, gallium, aluminum, nitrogen, phosphorous, silicon, and germanium; and
   (b) the particles are doped with at least one of tin, zinc, argon, bismuth, indium, gallium, aluminum, nitrogen, phosphorous, silicon, and germanium.

9. The battery of claim 8, further comprising a metal current collector coupled to the second layer of the anode, wherein the current collector comprises at least one of copper, nickel, and stainless steel.

10. The battery of claim 8, further comprising a third layer of metal current collector coupled to the second layer of the anode, wherein the current collector comprises at least one of copper, nickel, and stainless steel.

11. The battery of claim 8, wherein the second layer of the anode comprises pure metallic lithium.

12. The battery of claim 8, wherein the first layer of the anode comprises a porosity between 60 percent and 90 percent.

13. The battery of claim 8, wherein the anode is further comprised of a third layer, the third layer being a metal current collector coupled to the second layer, and wherein the current collector comprises at least one of copper, nickel, and stainless steel.

* * * * *